Patented Sept. 19, 1950

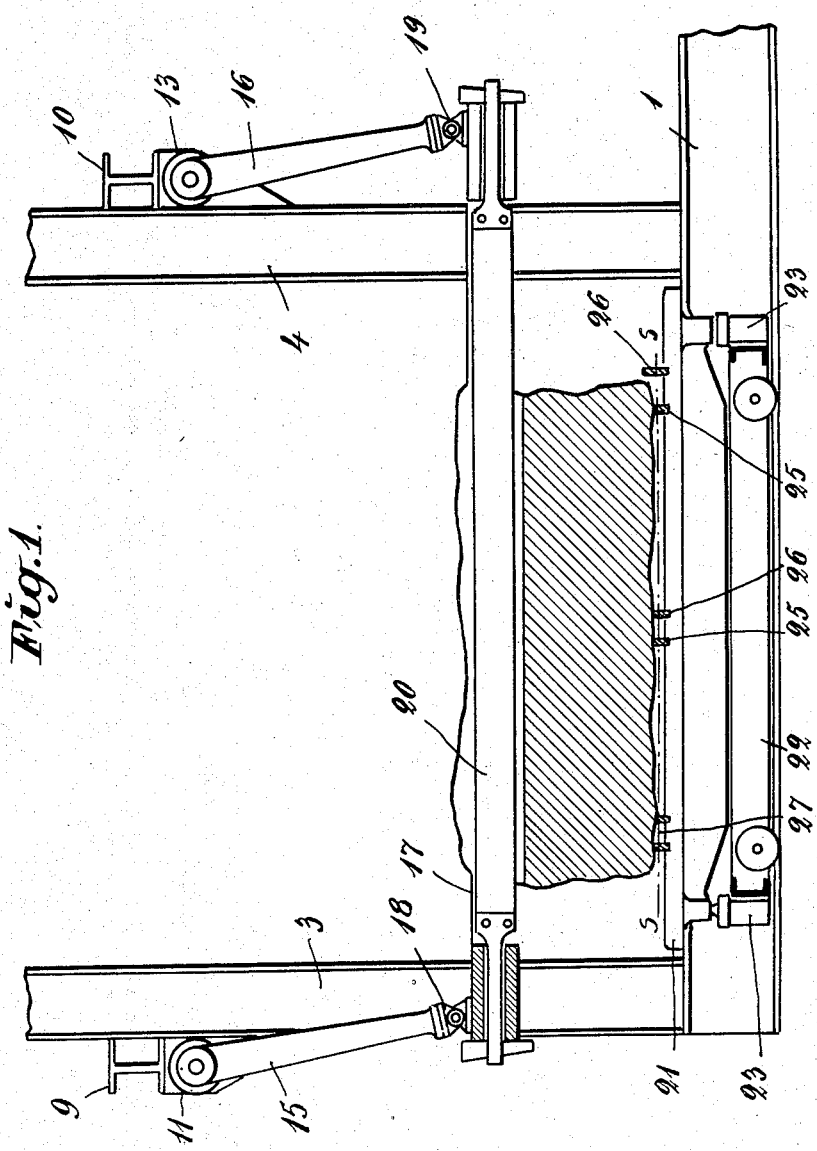

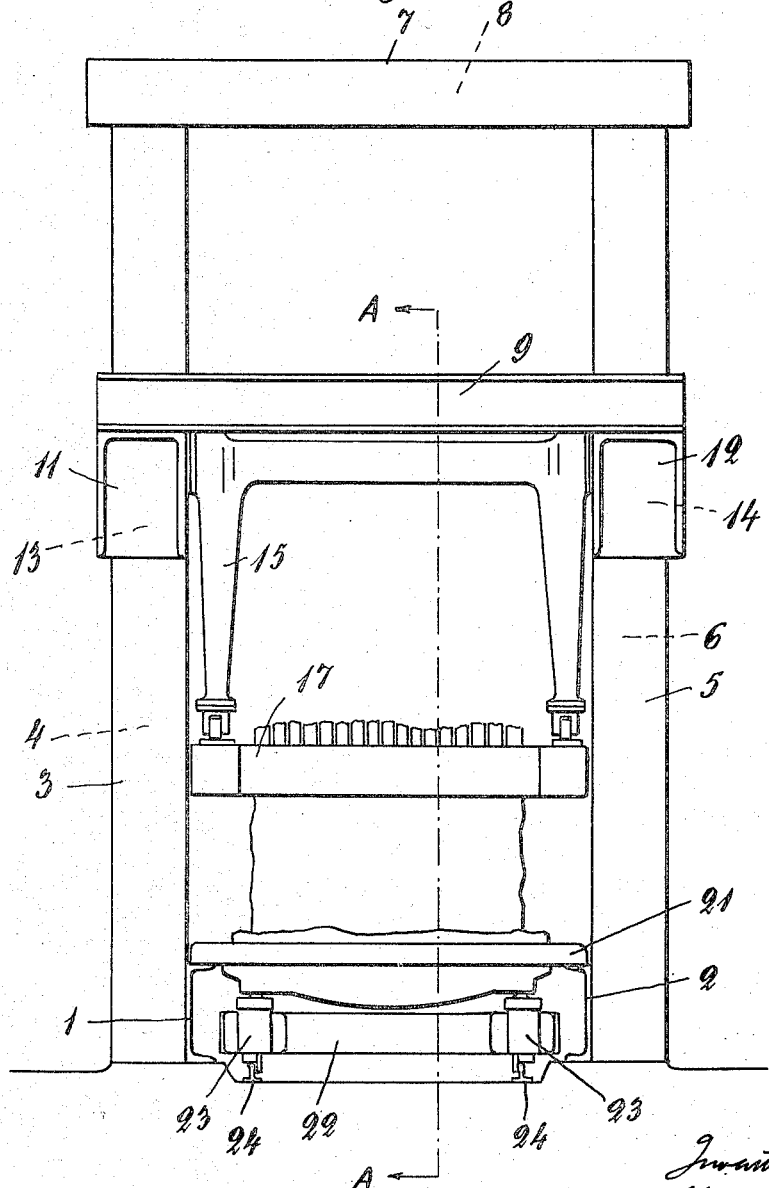

2,522,999

UNITED STATES PATENT OFFICE 2,522,999

METHOD OF SAWING STONES AND A DEVICE FOR CARRYING OUT THE SAME

Gottfrid Otto Alexander Dahlström, Vastervik, Sweden, assignor to Aktiebolaget Slipmaterial-Naxos, Vastervik, Sweden, a corporation of Sweden Application November 25, 1947, Serial No. 788,065
In Sweden December 21, 1946

4 Claims. (Cl. 125—16)

The present invention relates to an arrangement for improving the retention of a block of stone in a machine for sawing stones, thereby enabling a more rapid exchange of the blocks. The invention also relates to a method for carrying out the improved retaining device.

According to methods hitherto known and applied in cleavage sawing of rough stone blocks in so called gang-saw machines the blocks are secured in such a way that tension and/or wedge bonds are arranged between the sawing table and the block. It has always been time consuming and difficult to obtain a stable and strong retention of the blocks by this method. It has also frequently been necessary to hew the underside of the blocks in order to obtain an even supporting surface underneath. Despite a time consuming and careful work done according to this method it often occurs that, due to stresses during the sawing operation, the blocks become loose in the bonds, thus causing the saw to run awry. Especially in stone sawing machines of the type shown in the drawings and described below a dislocation of the blocks during sawing frequently causes a total spoiling of the saw blades. Further, by using tension bonds it is impossible to saw through the blocks entirely because of this being prevented by the tension bonds.

According to the present invention all these drawbacks are fully obviated. The principal object of the invention is attained in a simple way by fixing the blocks to a supporting table readily and easily removable from the sawing machine in a way described below with reference to the annexed drawings.

The drawings show a machine for sawing stones of the type mentioned above and arrangements for fixing the blocks in the machine. Fig. 1 is a view of a machine according to the invention partly in section on the line A—A of Fig. 2. Fig. 2 shows the end at which the supporting table with the block of stone is inserted in the machine.

The stone sawing machine usually comprises a construction built up of balks 1—8. On the vertical balks 3, 4, 5 and 6 there are arranged two traverses 9 and 10 with vertically slidable slides 11, 12 and 13, 14 respectively. These traverses are supported by four feeding screws, not shown. In the traverses there are swingably mounted pendulums 15 and 16, which carry the sawframe 17 at the journal-bearings 18 and 19. During the sawing the frame is given a reciprocating motion, which is communicated to the frame via connecting rods from a crank device arranged in the extension of the machine. A number of saw-blades 20 are extended in the frame in a manner which is obvious from the drawings. The number of saw blades mounted in the frame depends on the width of the block and of the thickness of the plates to be sawn therefrom. From this description it is obvious that the block necessarily must rest firmly in the machine and that the slightest disturbance of the block immediately involves the risk of the blades being ruined and/or of rendering the sawing impossible.

According to the principle of the invention the blocks of stone are secured in the machine by means of the device and the method described below. The supporting table 21 which during sawing fixedly rests on the balks 1 and 2 is readily withdrawn from the machine by means of the carriage 22 and the hydraulic jacks 23 arranged on the carriage. The carriage rolls on rails 24 running in the extension of the machine. With the aid of the synchronous operated jacks the supporting table is raised from the balks and will thereby come to rest exclusively on the carriage. The supporting table is provided with a number of transversal grooves 25 in which wooden fillets 26 or the like are inserted. Between the fillets there is spread a wet concrete composition or similar binding agent 27. This composition may for instance comprise a rapid hardening cement, flakes of marble and finely screened sand mixed with water or another softening agent. The block of stone is carefully washed on the supporting surface and is then deposited on the fillets. Due to the weight of the block the wooden fillets are somewhat compressed and follow the irregularities of the block. During the compression of the fillets the binding agent 27 is also pressed into the irregularities of the block at an elevated pressure and will at last completely fill up the irregularities.

The binding agent is fully hardened within a few hours, during which time said agent is bound to the block and to the supporting table. A bond of high strength and with substantially equal distribution of pressure is obtained. The carriage with the supporting table carrying the block is then inserted in the sawing machine. The jacks are released and the supporting table comes to rest on the balks 1 and 2 after which the sawing can be performed. According to the invention the blocks may be sawn through fully. The saw blades may freely be permitted to saw through to the line S—S in the drawing as, due to its composition, the bond may be sawn even as readily as the block of stone.

As the supporting table according to the invention is releasable from the machine and from the carriage it is possible for the purpose of saving time simultaneously to bind stone blocks to a number of supporting tables 21, which are successively inserted in the machine by one and the same transporting carriage 22. From the foregoing it is obvious that the time lost is reduced to a minimum.

What is claimed is:

1. In the sawing of a rough stone by the aid of a sawing machine and a transportable bed, the steps of placing a plurality of supporting elements of yieldable material in spaced relation on said bed, supporting a rough face of a stone on said elements to provide between said face and the confronting face of the bed a plurality of intermediate spaces, introducing a moldable binding agent capable of hardening into said spaces and into contact with the confronting faces of the stone and the bed and allowing said agent to harden to bind the stone and the bed together to form a rigid unit, inserting the unit into the machine, sawing the stone and thereafter removing the bed from the machine.

2. A stone supporting device for stone sawing machines comprising a bed providing a transportable table having a plurality of grooves in its upper face, yieldable elements seated in said grooves to provide support for the rough face of a stone to be sawn and forming walls of a mold for a binding agent to be introduced between the face of the table and the face of the stone for fixing the stone to said bed to form therewith a rigid unit.

3. Apparatus as set forth in claim 2, in which said elements comprise compressible wooden members.

4. In a stone sawing machine a bed providing a transportable table having grooves in its upper face, wooden elements seated in said grooves for supporting the rough face of a stone placed upon said bed, said elements further forming walls of a mold for a binding agent for fixing the stone to said bed to form therewith a rigid unit, a stationary support for said bed, a carriage for conveying said bed into a position above said stationary support and having vertically movable means adapted to carry said bed and to lower the bed to rest on said stationary support and to lift the bed from said stationary support, and sawing means positioned above said stationary support.

GOTTFRID OTTO
ALEXANDER DAHLSTRÖM.

REFERENCES CITED

The following references are of record in the file of this patent:

UNITED STATES PATENTS

| Number | Name | Date |
|---|---|---|
| 506,401 | Hill | Oct. 10, 1893 |
| 685,204 | Ewen | Oct. 22, 1901 |
| 1,194,520 | Lewis | Aug. 15, 1916 |
| 1,349,955 | Harwood | Aug. 17, 1920 |
| 1,685,661 | Allen | Sept. 25, 1928 |
| 2,135,047 | Carpenter | Nov. 1, 1938 |

FOREIGN PATENTS

| Number | Country | Date |
|---|---|---|
| 249,797 | Germany | July 30, 1912 |